United States Patent [19]
Someya

[11] Patent Number: 6,150,788
[45] Date of Patent: Nov. 21, 2000

[54] LOAD TORQUE DETECTION AND DRIVE CURRENT OPTIMIZATION DETERMINATION MET

[75] Inventor: Masayuki Someya, Braintree, Mass.

[73] Assignee: Seiberco Incorporated, Braintree, Mass.

[21] Appl. No.: 09/250,447

[22] Filed: Feb. 16, 1999

[51] Int. Cl.[7] .................................................. G05B 19/40
[52] U.S. Cl. .......................... 318/685; 318/696; 318/439
[58] Field of Search ................................... 318/685, 696, 318/254, 439

[56] References Cited

U.S. PATENT DOCUMENTS

| | | | |
|---|---|---|---|
| 3,842,332 | 10/1974 | Heine et al. | 318/696 |
| 4,035,708 | 7/1977 | Schaff | 318/696 |
| 4,074,179 | 2/1978 | Kuo et al. | 318/696 |
| 4,121,144 | 10/1978 | Leenhouts | 318/696 |
| 4,136,308 | 1/1979 | King | 318/696 |
| 4,336,484 | 6/1982 | Marinko | 318/696 |
| 4,477,757 | 10/1984 | Palombo et al. | 318/696 |
| 4,611,157 | 9/1986 | Miller et al. | 318/696 |
| 5,841,261 | 11/1998 | Nojima et al. | 318/696 |

*Primary Examiner*—Stanley J. Witkowski
*Assistant Examiner*—Rita Leykin
*Attorney, Agent, or Firm*—Ira S. Dorman

[57] ABSTRACT

The voltage at a node between a pair of series-connected windings of a synchronous or stepping motor is monitored during operation so as to detect transition voltage regions, the durations of which are indicative of the torque load on the motor and which are used as the basis for controlling the driving current amplitude so as to achieve enhanced efficiency of energy utilization. An optimum value for the duration of the transition voltage region will usually be established as a target, and adjustments will be so made as to conform subsequently detected node voltage values to those of the target.

27 Claims, 6 Drawing Sheets

|  | SW1 | SW2 | SW3 | SW4 | SW5 | SW6 | SW7 | SW8 | SW9 | SW10 |
|---|---|---|---|---|---|---|---|---|---|---|
| STATE#1 |  | ON | ON |  |  |  |  |  |  | ON |
| STATE#2 |  |  | ON |  |  | ON |  |  |  | ON |
| STATE#3 |  |  | ON | ON |  | ON |  |  |  |  |
| STATE#4 |  |  |  | ON |  | ON | ON |  |  |  |
| STATE#5 |  |  |  | ON | ON |  | ON |  |  |  |
| STATE#6 |  |  |  | ON |  |  | ON | ON |  |  |
| STATE#7 | ON |  |  |  | ON |  |  | ON |  |  |
| STATE#8 | ON |  |  |  |  |  |  | ON | ON |  |
| STATE#9 | ON | ON |  |  |  |  |  |  | ON |  |
| STATE#10 |  | ON |  |  |  |  |  |  | ON | ON |

LOAD TORQUE DETECTION AND DRIVE CURRENT OPTIMIZATION DETERMINATION MET

BACKGROUND OF THE INVENTION

Conventional servo motor systems usually employ position detectors to enable the provision of the most effective position commands for driving the motor, and thereby to maximize operating efficiencies. The incorporation of such a device adds substantially to the cost and complexity of the motor system, however, and also increases the difficulty of utilizing it most effectively.

Stepping motor systems inherently afford high positioning performance and other beneficial attributes; because no position detection device is needed, moreover, they of course avoid the attendant disadvantages. On the other hand, practical operation of such motors requires the Application of excessive drive currents so as to ensure that synchronism is maintained. Thus, and despite load changes, the current supplied must be set for the maximum that would normally be employed during acceleration; typically, the current utilized to drive a stepping motor is at least double that which is actually demanded by the load. Substantial amounts of energy are wasted (as excessive heat) as a result, thereby rendering such systems relatively inefficient in respect of power consumption.

SUMMARY OF THE INVENTION

Accordingly, the broad objects of the present invention are to provide a novel stepping motor system, and a novel method and apparatus for controlling operation thereof, wherein and whereby drive current supplied to the motor can be optimized so as to improve energy utilization efficiency.

More specific objects of the invention are to provide such a system, apparatus, and method wherein and whereby the torque load upon the motor can be estimated and utilized to optimize (normally, by selective reduction) the current supplied for driving the motor.

Additional specific objects of the invention are to provide such a system, apparatus, and method wherein and whereby motor operation is relatively facile, and complexity and cost are relatively low.

Following drive state transitions in stepping motor systems driven by square waveform voltages, it is observed that the voltages which appear at open nodes between adjacent, series-energized windings vary initially, as a function of time, in a manner that is significant. A lag occurs in attaining a steady state node voltage (i.e., at a commanded level intermediate the terminal potentials), which lag is attributable to motor winding inductance and has a value that bears a substantially linear relationship to the torque load on the motor. This relationship is reflected in profiles of the node voltage values that are generated during the settling and steady state phases, which profiles consist of identifiable portions (referred to herein as "transition voltage regions") that are indicative of the effects of the inductive "fly-back" currents and, in turn, of the torque load on the motor; these features will be discussed more fully hereinbelow.

It has now been found that certain of the foregoing and related objects of the invention are attained by the provision of a method for controlling operation of a stepping motor having a multiplicity of series-connected windings arranged in ring configuration and energized with a square waveform voltage, which method comprises the following steps: monitoring voltage at a node between at least one pair of series-connected windings, during operation of the motor at a given speed, to detect transition voltage regions that occur following energization of the pair of windings by the driving current; measuring the duration (i.e., width, as a function of time) of at least one detected transition voltage region; establishing at least one target duration value for the detected transition voltage regions; comparing the measured duration of at least one transition voltage region to the target duration value; and adjusting the motor current amplitude as necessary to cause the measured duration of the detected transition voltage region to at least approach the target duration value, and desirably to conform substantially thereto.

The monitored node voltage will normally follow a transition profile that begins immediately following a change of state in which the pair of windings is energized by the driving current, and that ends with a change of state in which the energizing current to the pair is terminated. Each such profile will consist of an initial, inductance-dominated region and, immediately thereafter, a reactance-dominated region, with one of the two regions constituting the "transition voltage region" employed herein.

The target duration value will normally lie intermediate the durations of minimal and maximal transition voltage regions predetermined for the motor being controlled (or for another equivalent motor), operating at the given speed and under minimal and maximal torques loads, respectively. Such minimal, maximal, and intermediate target duration values will preferably be established for the motor at each of a multiplicity of values of the driving current amplitude, to thereby establish minimal and maximal curves and a target duration line to which the measured duration of the transition voltage regions are compared in the comparing step.

If the measured duration lies above or below the target line, the value of the driving current amplitude will be increased or decreased accordingly; in the instance in which the reactance-dominated region constitutes the transition voltage region, the amplitude will be increased when the measured duration lies between the target line and the maximal curve, and decreased when it lies between the target line and the minimal curve. A multiplicity of such target lines will usually be established, each corresponding to operation of the motor at a different speed, and that will generally (and most desirably) be done by operating the motor and storing the resulting pertinent motor system parameters in an electronic memory, thereby creating a library of target duration lines which can be accessed for comparison. The method of the invention will usually include the further steps of utilizing the measured duration of the detected transition voltage regions to estimate the torque load on the motor and, based directly or indirectly thereupon, of calculating a value for the driving current amplitude (utilizing electronic data processing techniques known or evident to those skilled in the art) that will cause subsequently measured duration values to approach, and ideally to conform to, the target line.

Other objects of the invention are attained by the provision of apparatus for controlling operation of a motor of the character described, the apparatus comprising: means for monitoring voltage at a node between at least one pair of series-connected windings of the motor, to detect transition voltage regions; means for measuring the duration of the detected transition voltage regions; means for comparing the measured duration of the voltage regions to a target duration value thereof; and means for effectively adjusting the amplitude of the driving current as necessary to substantially conform the measured duration to the target duration value.

Further objects are attained by the provision of a motor system comprising, in addition to the control apparatus described, a stepping motor having a stator comprised of a multiplicity of windings, series connected in ring configuration; and means for providing a square waveform voltage to the windings as series-connected pairs and in a commutation sequence for driving the motor, the voltage provided being adjustable, such as by adjustment of its duty cycle, to enable control of the motor current amplitude.

The control apparatus and motor system of the invention will normally include memory means for electronically storing at least one target duration value, of the character described, for comparison with the measured duration of the detected transition voltage regions. In most instances the memory will store a multiplicity of target lines, representing ranges of current amplitude values and motor operating speeds, and other features adapted for implementing the method steps described may of course be incorporated as well. The "means for comparing" will normally comprise electronic data processing means, programmed to effect appropriate increases and decreases in the value of the driving current amplitude depending upon the position of the measured duration of the transition voltage region relative to the stored target duration line. The data processing means will generally be programmed to effect the further steps of utilizing the measured duration of the detected transition voltage regions to estimate the torque load on the motor, and of calculating an optimal value for the driving current amplitude based thereupon.

DETAILED DESCRIPTION OF THE PREFERRED AND ILLUSTRATED EMBODIMENTS

Figure 1:
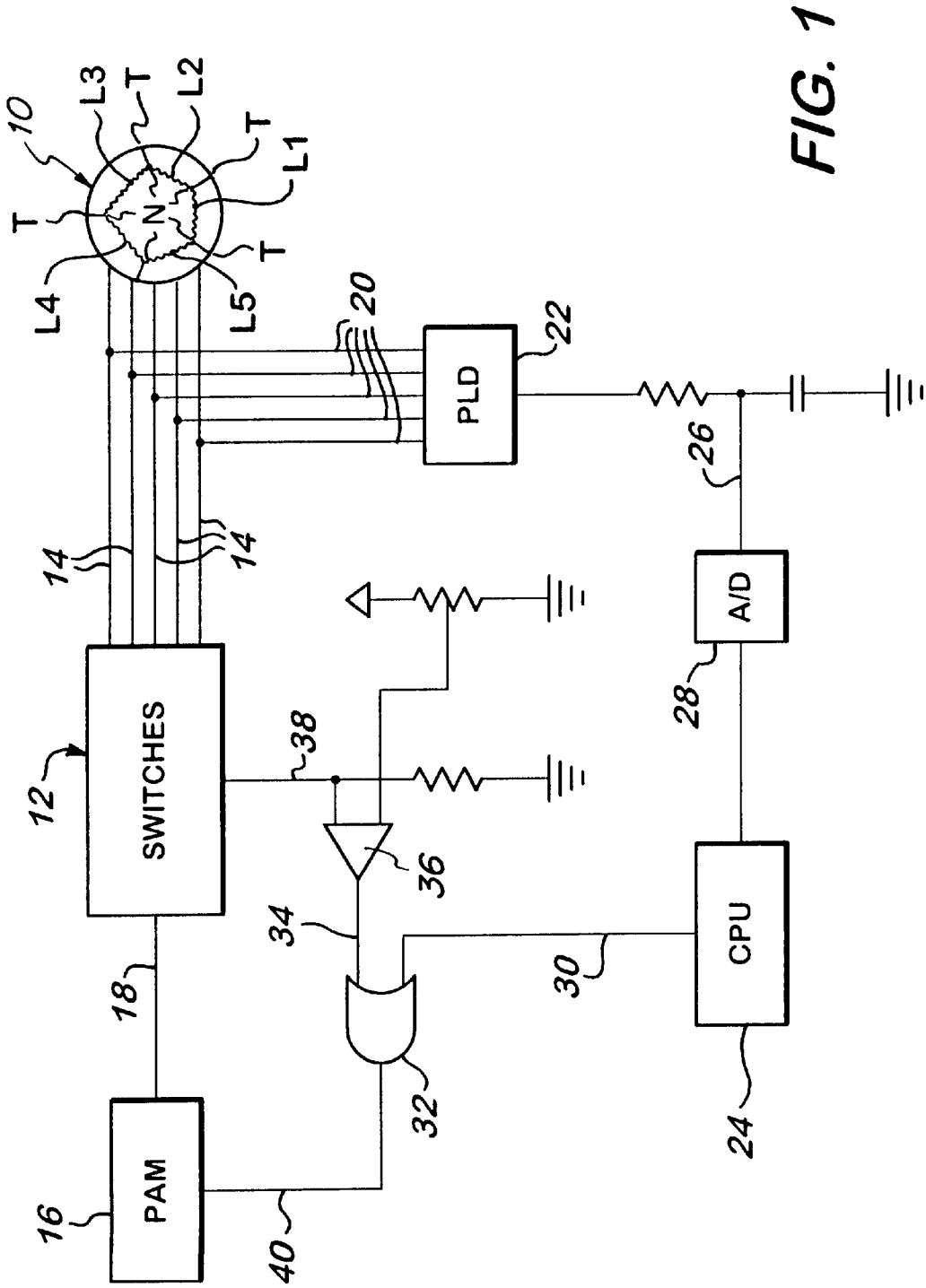
FIG. 1 is a schematic diagram of a five-phase stepping motor system embodying the present invention.

Turning initially to FIG. 1 of the drawings, therein illustrated is a five-phase stepping motor system embodying the invention and including a stepping motor, generally designated by the numeral 10, having five windings L1 through L5 arranged in a series-connected pentagonal configuration. A node N is present between each adjacent pair of windings L1 through L5, and each node N is connected to a terminal T. A set of MosFet switches (not seen in this Figure) collectively comprise the switch component, generally designated by the numeral 12, and serve to control the flow of current through lines 14 to the motor winding terminals; a pulse amplitude modulation (PAM) unit 16 supplies current to the motor through rail 18 by way of the switch component 12.

A tap line 20 operatively connects an integrated circuit, programmable logic device (PLD) 22 to each of the drive current lines 14. The PLD measures the durations of transition voltage regions detected at each of the nodes N1–N5, and supplies a representative signal to a central processing unit (CPU) 24, through line 26 and an analog-to-digital (A/D) convertor 28, the CPU containing appropriate ROM capacity and other necessary features that will be evident to those skilled in the art.

A "new" PWM signal is calculated in the CPU, and is provided through line 30 to an OR gate 32. The "new" signal calculation is made by comparing the measured durations of the detected transition voltage regions to established optimal duration values stored in the memory of the CPU; this will provide an indication of the torque load on the motor, from which a suitable drive current demand can be determined. An "original" PWM signal is simultaneously provided to the OR gate 32 through line 34 from a comparator 36, which operates upon a signal from the switch component 12, received along line 38, that is representative of the existing current settings; the comparator 36 serves to limit the phase current. A composite PWM signal for controlling the amplitude of the motor drive current is delivered through line 40 to the PAM unit 16.

Figure 2A:
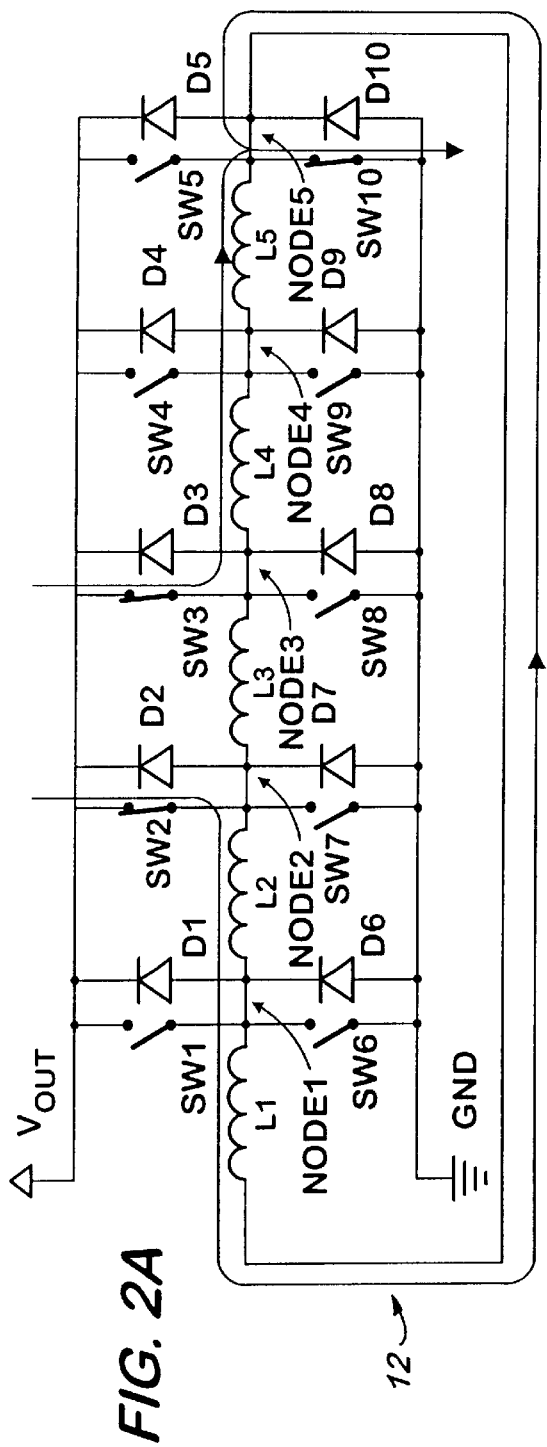
FIGS. 2A and 2B are wiring diagrams showing an arrangement of MosFet switches and motor windings suitable in a system such as that of FIG. 1, in two sequential drive state configurations.
Figure 2B:
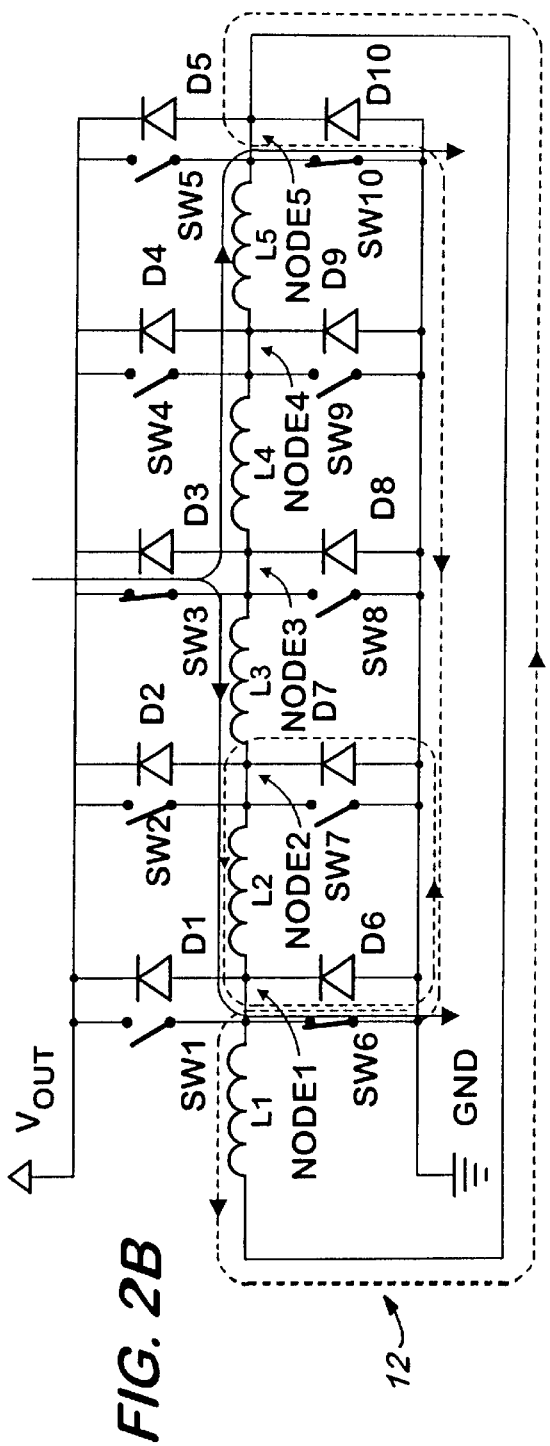
Figures 3, 4:
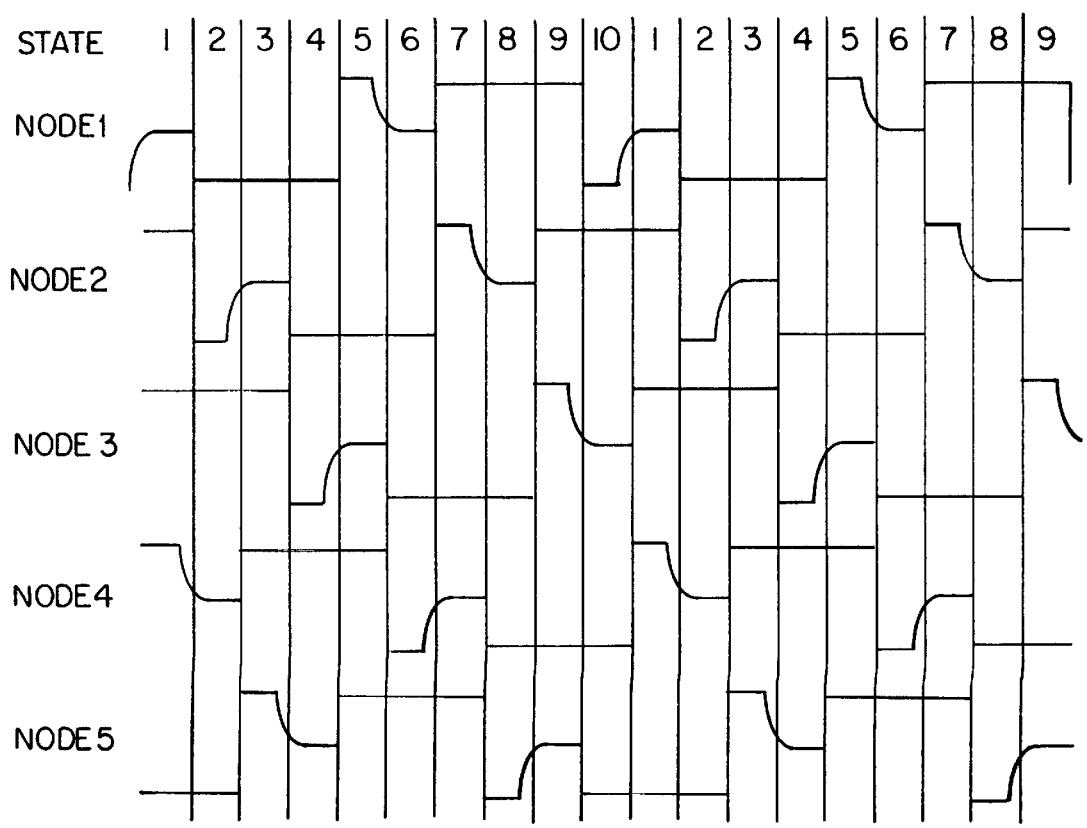
FIG. 3 is a state sequence table showing switch positions for the stepping motor system of the preceding Figures, in implementation of a "four phases on" scheme.
FIG. 4 presents profiles of the voltages detected at each of the five nodes of the illustrated stepping motor operated, in accordance with the scheme of FIG. 3, through two cycles of ten drive state transitions each.

FIGS. 2A and 2B depict the positions of the MosFet switches (SW1 through SW10) of component 12 for energizing the motor 10 in each of two sequential states, in accordance with the "four phases on" excitation pattern underlying the sequence table of FIG. 3 (wherein the absence of an "ON" notation indicates that the switch is off); the circuits also include fly-back diode clamps D1 through D10. For simplicity and clarity of explanation, the electrical potential at only one of the nodes N (i.e., NODE2) is specifically discussed hereinafter, albeit the same profile of voltage values is observable at each of the nodes; this can be seen from FIG. 4, wherein the voltages are correlated to the motor excitation state settings listed in FIG. 3.

With the MosFet switches set as depicted in FIG. 2A (STATE #1), the flow of current delivered through rail 18 and conducted to ground (GND) is shown by the solid line representation; the value of the potential applied is designated $V_{out}$. The switch configuration in STATE#2 is depicted in FIG. 2B, as is the flow of current from rail 18 through the connected windings to GND. The inductive fly-back currents that are generated in the transition from STATE#1 to STATE#2 are indicated by the dotted line flow paths depicted in FIG. 2B.

Figure 5:
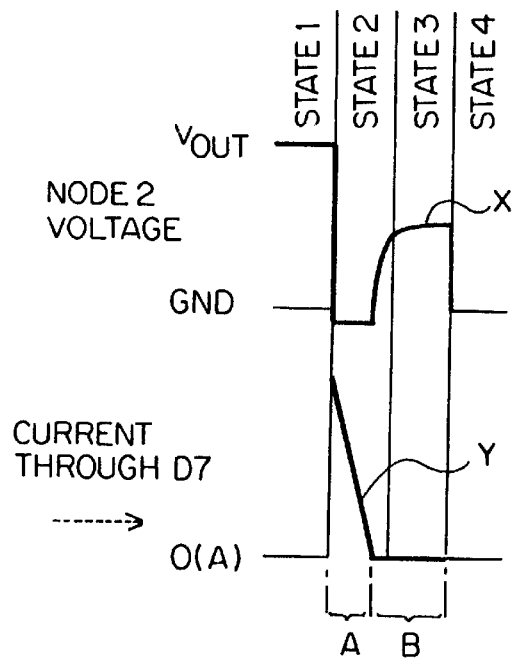
FIG. 5 is a diagram showing a portion of the voltage profile "X", during four sequential transition states, that appears at one of the nodes of the motor system described, and also showing a corresponding profile "Y" of the variation that occurs simultaneously in the induced "fly-back" current generated in the affected windings.

As is more specifically shown in FIG. 5, the voltage at NODE2 has the value $V_{out}$ with the motor in STATE#1 energization. At the instant of transition to STATE#2 energization, the potential at NODE2 decreases until it reaches (at a value below GND) the forward bias current passing through diode D7, which becomes conductive and maintains the NODE2 voltage. As winding L3 begins charging at full potential ($V_{out}$–GND) and establishing a new current path through L2, the voltage at NODE2 begins to rise until the current through L2 and L3 attain the same level. Thereafter, a steady state condition, with a value of one-half the full applied potential difference ($V_{out}$–GND)/2 will be detected at NODE2. That condition will be maintained until the transition to STATE#4 is effected, with SW7 being closed so as to connect NODE2 directly to GND.

It is thus seen that the voltage detected at an open node between a series-connected pair of windings follows a transition profile that begins immediately following a change of state, in which the pair of windings is energized by a square waveform voltage, and that ends with a change of state in which the energizing current to the pair is terminated. The profile may be viewed to have two regions, i.e., an initial, inductance-dominated region, designated "A" in FIG. 5 and, immediately thereafter, a reactance-dominated region, designated "B." The duration (width) of each of the regions A and B is dictated by the fly-back current that affects the voltage at the accessed node; since the transition time (e.g., from STATE#1 to STATE#4) remains fixed for a given speed, the regions bear an inversely proportionate, complementary relationship to one another, i.e., the shorter the duration of region A the longer will be the duration of region B, and vice versa.

In accordance with the present invention, it has been appreciated that the widths of the regions A and B are indicative of the torque load on the motor. Either region may be taken as a basis for estimating the load, but region B was arbitrarily selected and will therefore constitute the "detected transition voltage region" in the discussion that follows; the same principles are of course applicable in utilizing region A, albeit with some inversion of values and relationships, as will be self-evident.

Figure 6A:
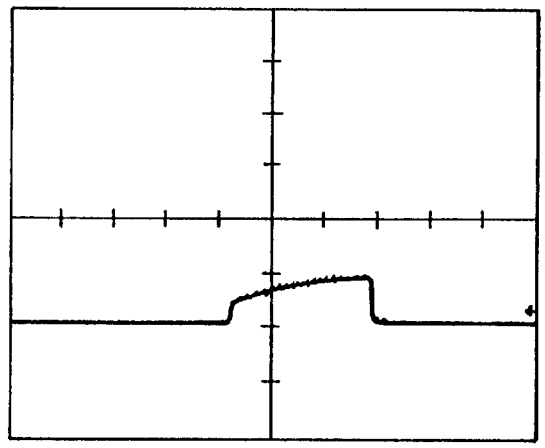
FIGS. 6A and 6B are expanded time-scale graphs of transition voltage profiles generated with the motor operating at constant speed and under two different torque loads.
Figure 6B:
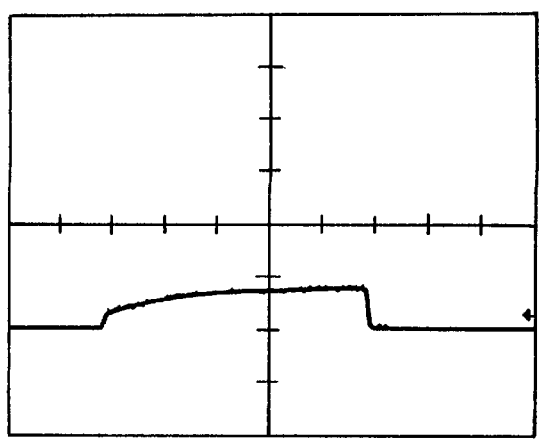
Figure 7:
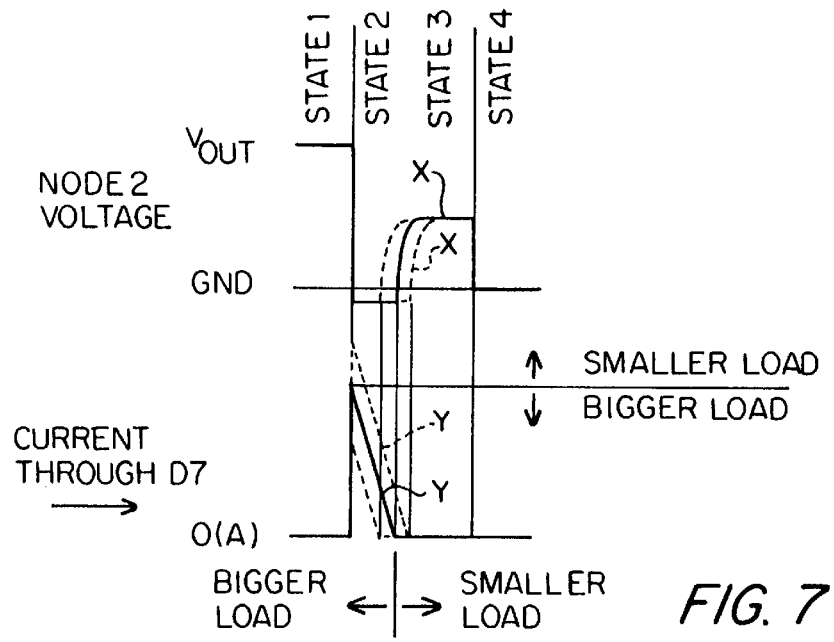
FIG. 7 is a diagram, similar to that of FIG. 5, showing the effects of three different torque loads upon the fly-back current and the node voltage profile.

In FIGS. 6A and 6B the effect of the magnitude of the torque load upon the width of the detected transition voltage region B is illustrated. FIG. 6A shows a portion of the detected node voltage profile generated by a motor, such as that of the illustrated embodiment, operating at a speed of 1000 revolutions per minute at its rated current of 1.4 amperes per phase, and subjected to no applied torque load; the profile of FIG. 6B represents the same portion of the node voltage profile with the motor running at the same speed but subjected to a maximum sustainable torque load (i.e., a load that is just below that at which synchronism is lost). The width of the region B under no-load conditions represents a duration of about 260 microseconds, whereas under maximum load conditions the width of the region represents a duration of about 340 microseconds. The difference in the width of region B (and inversely, in the preceding region A) is attributable to the generation of an induced fly back current that has a relatively high peak value when the motor is subjected to a relatively small load (resulting in a relatively narrow reactance-dominated region B), and to the generation of a relatively low peak fly-back current value (and hence a relatively wide region B) when the motor is subjected to a relatively large torque load. These relationships are illustrated in FIG. 7.

By way of explanation, it will be appreciated that the magnitude of the peak fly-back current generated will depend upon the inductance of the energized torque windings, that the inductance is influenced by the angular position of the rotor, and that the torque load on the motor shaft will determine the extent to which the rotor lags the actual commanded angle. Thus, the greater the load torque on the motor the lower will be magnitude of the peak fly-back current, and hence the narrower will be the inductance-dominated region (and the wider the reactance-dominated region) of the transition voltage profile.

Figure 8:
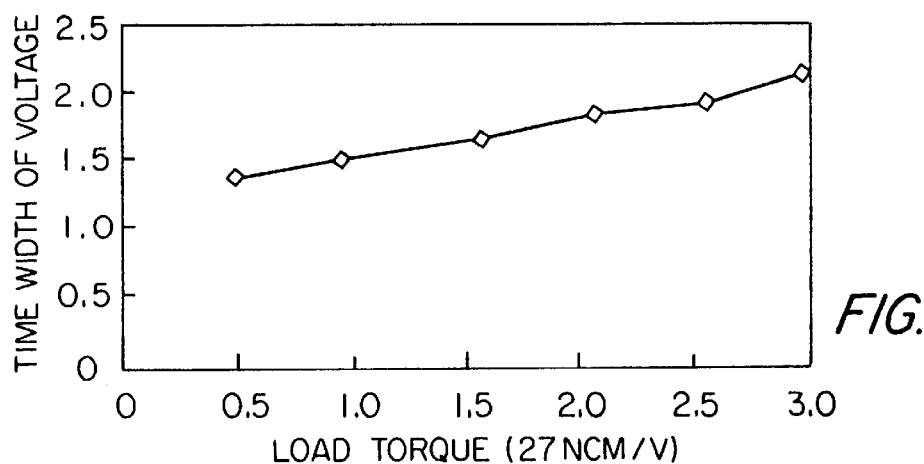
FIG. 8 is a plot showing the substantially linear relationship that exists between the duration of a measured transition voltage region and the motor torque load.

FIG. 8 is a graph in which the torque load applied to the motor is plotted against the detected node voltage duration (time width). As can be seen, the relationship is substantially linear.

Figure 9:
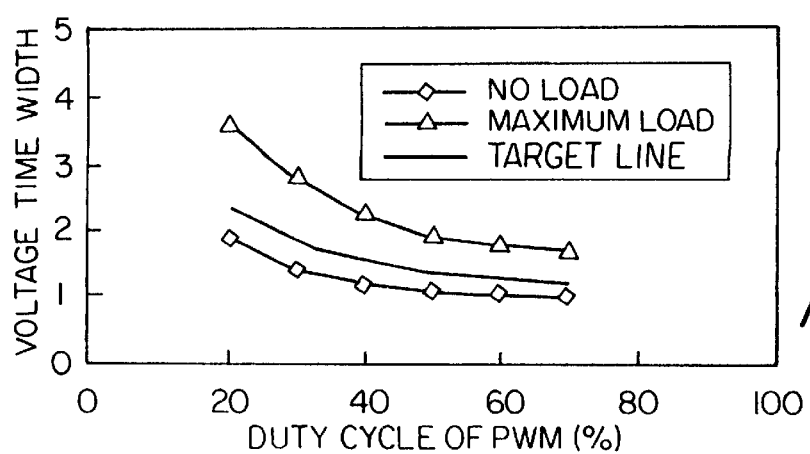
FIG. 9 is a graph showing the effects of the supply current duty cycle upon the duration of transition voltage regions under no-load and maximum load conditions, and also showing an interposed, optimal duration target line.

The No-load (rectangular points) and Maximum load (triangular points) lines depicted in FIG. 9 show the effect of the supply current amplitude (as controlled in this instance by the applied voltage duty cycle) upon the transition voltage regions detected at the nodes. As can be seen, the duration (voltage time width) of the region decreases in inverse relation to the duty cycle, and hence to the supply current amplitude.

FIG. 9 also includes a target line. Although its position is somewhat arbitrary, the target line must in all instances be located between the no-load and the maximum load curves, and will desirably lie substantially intermediate thereof. If the target line is too close to the no-load curve, current amplitude adjustments will occur too frequently and the motor will tend to run erratically; if, on the other hand, the target line is too close to the maximal load curve a commensurately small margin for error will be provided and an undue risk of overshooting, with resulting loss of synchronism, will be engendered.

Figure 10:
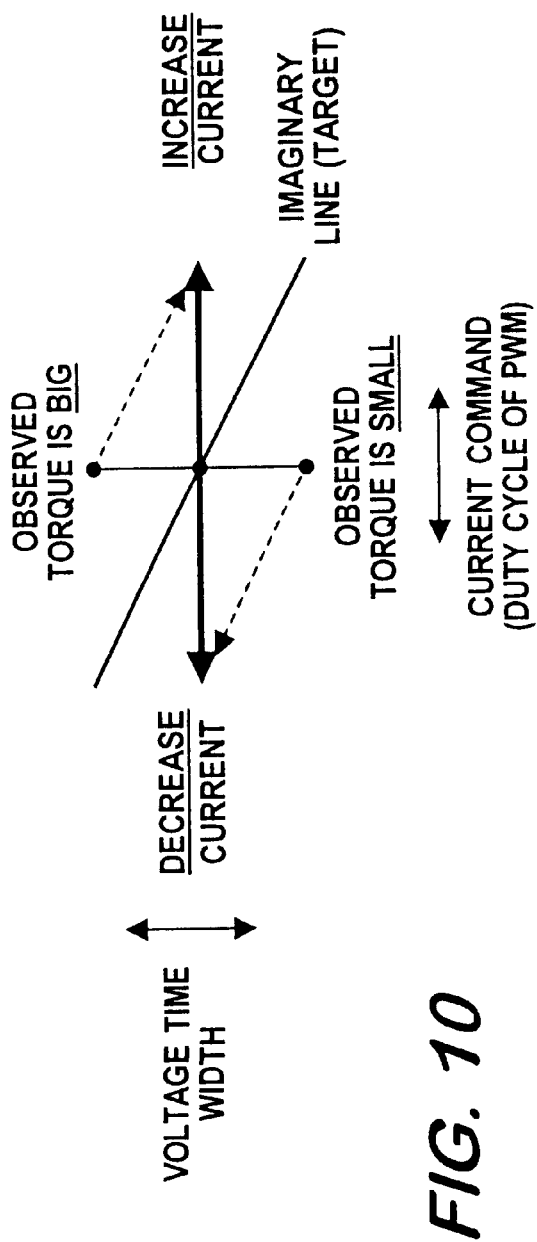
FIG. 10 is a diagram illustrating the general criteria that are applied for conforming the duration of the detected transition voltage region to the target value.

The basic principles that dictate the changes that are to be effected in the supply current amplitude, so as to achieve the efficiencies that the present invention affords, are indicated by Figure 10. If the torque load on the motor is relatively large the duty cycle of the supply voltage (in the illustrative embodiment described) will be increased so as to thereby increase the current amplitude and in turn decrease the width of the measured transition voltage region, shifting it toward, and ideally into conformity with, the value that is indicated by the target line. Conversely, if the determined torque load is relatively small the duty cycle will be decreased so as to once again cause the voltage duration to approach the target line. It will be appreciated that, for example, the relationship between the current amplitude and the duration of the transition region would be inverted if region A of the voltage profile were used instead of region B for torque load estimation.

Figure 11:
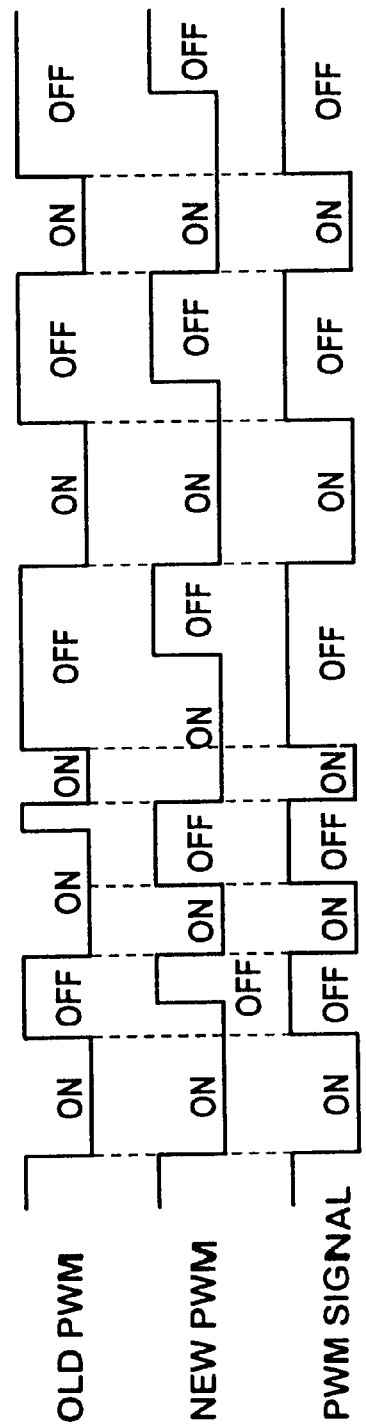
FIG. 11 is a timing diagram showing the derivation of a pulse width modulation (PWM) signal for controlling the current to the motor, as affected by the technique of the invention.

Finally, the timing diagram of FIG. 11 illustrates the logic by which the composite PWM signal may be established for providing an optimal current supply to the motor. As mentioned previously, the composite PWM signal is generated from the OR gate output, utilizing the "original" PWM signal and the "new" PWM signal, which signals are of the same frequency and have the timing of their down edges synchronized. The "original" PWM signal represents the maximum current for the driver circuit, whereas the "new" PWM signal is determined by the controller utilizing the load torque-sensing technique of the invention. Since the OR gate always takes the high logic level signal (if one is present, i.e., a high OFF signal is controlling over a low ON signal), the load torque-sensing feature the instant system decreases the duty cycle in the composite PWM signal, which controls the activity of the PAM circuit so as to provide an optimized current supply to the motor.

As will be appreciated by those skilled in the art, many variations can be made in the method, apparatus, and system of the invention without departure from the novel concepts described and defined herein. For example, motors having triangular, rectangular, and other ring-shaped winding configurations can be employed; indeed, the current control and torque estimation techniques of the invention are believed to be applicable to any motor system from which the characterizing transition voltage a regions, described herein, can be derived. Moreover, although pulse width modulated duty cycle adjustments have been mentioned as a means for optimally controlling the current amplitude, other techniques for doing so can of course be employed, such as for example by way of analog current feedback using a comparator.

Thus, it can be seen that the present invention provides a novel stepping motor system, and a novel method and apparatus for controlling operation thereof, wherein and whereby drive current supplied to the motor can be optimized so as to improve energy utilization efficiency. In accordance with the invention the torque load can be estimated and utilized to optimize the current supplied for driving the motor, and the invention provides a system, apparatus, and method wherein and whereby motor operation is relatively facile, and complexity and cost are relatively low.

Having thus described the invention, what is claimed is:

1. A method for controlling operation of a stepping motor having a multiplicity of series-connected windings arranged in ring configuration and driven by a square waveform voltage, comprising the steps:

monitoring voltage at a node between at least one pair of series-connected windings, during operation of the motor at a given speed, to detect transition voltage regions that occur following energization of said pair of windings by the driving current;

measuring the duration of said detected transition voltage regions;

establishing at least one target duration value for said detected transition voltage regions;

comparing said measured duration of at least one of said transition voltage regions to said target duration value; and adjusting the driving current amplitude as necessary to substantially conform said measured duration to said target duration value.

2. The method of claim 1 wherein said monitored node voltage follows profiles that begin immediately following a change of state in which said pair of windings is energized by said driving current, and that end with a change of state in which said energizing current to said pair is terminated, each of said profiles consisting of an initial, inductance-dominated region and, immediately thereafter, a reactance-dominated region, one of said inductance-dominated region and said reactance-dominated region of said voltage profiles constituting each of said detected transition voltage regions.

3. The method of claim 2 wherein said reactance-dominated region of said voltage profiles constitutes each of said detected transition voltage regions.

4. The method of claim 3 wherein said target duration value lies intermediate the durations of minimal and maximal transition voltage regions predetermined for such a said motor, operating at said given speed and under minimal and maximal load torques, respectively.

5. The method of claim 4 wherein such an intermediate target duration value is established for such a said motor, operating at said given speed and under maximal and minimal torque loads, at each of a multiplicity of values of said driving current amplitude, thereby to establish a target duration line to which said measured duration of said transition voltage regions are compared in said comparing step.

6. The method of claim 5 wherein, if said measured duration lies above or below said target duration line said driving current amplitude is increased or decreased, respectively.

7. The method of claim 6 including the further steps of utilizing said measured duration of said detected transition voltage regions to estimate the torque load on said motor, and of calculating a value for said driving current amplitude, based upon said estimated load, to cause subsequently measured duration values to approach said target duration line.

8. The method of claim 5 wherein a multiplicity of said target duration lines are established, one of said target duration lines being established for such a said motor operating at each of a multiplicity of different speeds.

9. The method of claim 8 wherein said target duration lines are established by operating said motor, and wherein a library of said target duration lines is created by storing operating parameters of said motor, and corresponding detected transition voltage region data, in electronic memory means, said library of target duration lines being accessible for comparison with said measured duration in said comparing step.

10. Apparatus for controlling operation of a stepping motor having a multiplicity of series-connected windings arranged in ring configuration and driven by a square waveform voltage, comprising:

means for monitoring voltage at a node between at least one pair of series-connected windings of the motor, to detect transition voltage regions;

means for measuring the duration of said detected transition voltage regions;

means for comparing said measured duration of said transition voltage regions to a target duration value thereof; and means for effectively adjusting the amplitude of the current for driving the motor, as necessary to substantially conform said measured duration to said target duration value.

11. The apparatus of claim 10 wherein said monitored node voltage follows profiles that begin immediately following a change of state in which said pair of windings is energized by said driving current, and that end with a change of state in which said current to said pair is terminated, each of said profiles consisting of an initial inductance-dominated region and, immediately thereafter, a reactance-dominated region, one of said inductance-dominated region and said reactance-dominated region of said voltage profiles constituting each of said detected transition voltage regions.

12. The apparatus of claim 11 wherein said reactance-dominated region of said voltage profiles constitutes each of said detected transition voltage regions.

13. The apparatus of claim 10 additionally including memory means for electronically storing at least one target duration value for comparison with said measured duration of said detected transition voltage regions.

14. The apparatus of claim 13 wherein said memory means contains at least one said target duration value which lies intermediate the durations of minimal and maximal transition voltage regions predetermined for such a said motor, operating at said given speed and under minimal and maximal load torques, respectively.

15. The apparatus of claim 14 wherein such an intermediate target duration value is stored in said memory means, for such a said motor operating at said given speed and under maximal and minimal torque loads, at each of a multiplicity of values of said driving current amplitude, said stored target duration values constituting a stored target duration line to which said measured duration of said transition voltage regions may be compared by said means for comparing.

16. The apparatus of claim 15 wherein said means for comparing comprises electronic data processing means, said data processing means being programmed to effect increases and decreases in the amplitude of said driving current if said measured duration lies above or below said stored target duration line, respectively.

17. The apparatus of claim 16 wherein said data processing means is programmed to effect the further steps of utilizing said measured duration of said detected transition voltage regions to estimate the torque load on the motor, and of calculating a value for said driving current amplitude, based upon said estimated load, to cause subsequently measured duration values to substantially conform to said target duration line.

18. The apparatus of claim 15 wherein a multiplicity of said target duration lines are stored in said memory means, one of said target duration lines being established for the motor operating at each of a multiplicity of different speeds.

19. A motor system, comprising:
a stepping motor having a stator comprised of a multiplicity of windings, series connected in ring configuration;
means for providing an adjustable square waveform voltage to energize said windings as series-connected pairs, in a commutation sequence for driving said motor; and
control apparatus for controlling operation of said motor, said control apparatus comprising:
  means for monitoring voltage at a node between at least one pair of said series-connected windings of said motor, to detect transition voltage regions;
  means for measuring the duration of said detected transition voltage regions;
  means for comparing said measured duration of said transition voltage regions to a target duration value thereof; and
  means for effectively adjusting the square waveform voltage provided by said means for providing, to thereby adjust the amplitude of the current for driving said motor as necessary to substantially conform said measured duration to said target duration value.

20. The system of claim 19 wherein said monitored node voltage follows profiles that begin immediately following a change of state in which said pair of windings is energized by said driving current, and that end with a change of state in which said energizing current to said pair is terminated, each of said profiles consisting of an initial inductance-dominated region and, immediately thereafter, a reactance-dominated region, one of said inductance-dominated region and said reactance-dominated region of said voltage profiles constituting each of said detected transition voltage regions.

21. The system of claim 20 wherein said reactance-dominated region of said voltage profiles constitutes each of said detected transition voltage regions.

22. The system of claim 19 additionally including memory means for electronically storing at least one target duration value for comparison with said measured duration of said detected transition voltage regions.

23. The system of claim 22 wherein said memory means contains at least one said target duration value which lies intermediate the durations of minimal and maximal transition voltage regions predetermined for such a said motor, operating at said given speed and under minimal and maximal load torques, respectively.

24. The system of claim 23 wherein such an intermediate target duration value is stored in said memory means, for such a said motor operating at said given speed and under maximal and minimal torque loads, at each of a multiplicity of values of said driving current amplitude, said stored target duration values constituting a stored target duration line to which said measured duration of said transition voltage regions may be compared by said means for comparing.

25. The system of claim 24 wherein said means for comparing comprises electronic data processing means, said data processing means being programmed to effect increases and decreases in the amplitude of said driving current if said measured duration lies above or below said stored target duration line, respectively.

26. The system of claim 25 wherein said data processing means is programmed to effect the further steps of utilizing said measured duration of said detected transition voltage regions to estimate the torque load on said motor, and of calculating a value for said driving current amplitude, based upon said estimated load, to cause subsequently measured duration values to substantially conform to said target duration line.

27. The system of claim 24 wherein a multiplicity of said target duration lines are stored in said memory means, one of said target duration lines being established for said motor operating at each of a multiplicity of different speeds.

* * * * *